United States Patent
Sakanaka

(10) Patent No.: US 6,968,133 B2
(45) Date of Patent: Nov. 22, 2005

(54) OPTICAL FREE-SPACE COMMUNICATION APPARATUS

(75) Inventor: Tetsuo Sakanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 09/838,277

(22) Filed: Apr. 20, 2001

(65) Prior Publication Data

US 2001/0043626 A1    Nov. 22, 2001

(30) Foreign Application Priority Data

May 15, 2000   (JP) .............................. 2000-141349

(51) Int. Cl.[7] .............................................. H04B 10/00
(52) U.S. Cl. ....................... 398/122; 398/129; 398/131
(58) Field of Search ............................... 398/122, 123, 398/124, 125, 128, 129, 130, 131, 137, 156, 398/163, 93, 96, 32

(56) References Cited

U.S. PATENT DOCUMENTS

| | | |
|---|---|---|
| 5,500,754 A | 3/1996 | Orino et al. |
| 5,530,577 A | 6/1996 | Orino et al. |
| 5,594,580 A | 1/1997 | Sakanaka et al. |
| 5,610,748 A | 3/1997 | Sakanaka et al. |
| 5,627,669 A * | 5/1997 | Orino et al. ................. 398/129 |
| 5,680,241 A | 10/1997 | Sakanaka et al. |
| 5,684,614 A * | 11/1997 | Degura ........................ 398/131 |
| 6,122,084 A * | 9/2000 | Britz et al. ................. 398/131 |
| 6,347,001 B1 * | 2/2002 | Arnold et al. ............... 398/122 |

* cited by examiner

Primary Examiner—Leslie Pascal
Assistant Examiner—Dalzid Singh
(74) Attorney, Agent, or Firm—Fitzpatrick, Cella, Harper & Scinto

(57) ABSTRACT

An optical free-space communication apparatus includes a first light-emitting source for emitting a first transmission optical beam having a plane of polarization in a predetermined direction, the first transmission optical beam being modulated according to a primary signal containing communication information, a second light-emitting source for emitting a second transmission optical beam having a plane of polarization perpendicular to the plane of polarization of the first transmission optical beam, the second transmission optical beam being modulated according to an auxiliary signal for angle detection, a transmitting optical system for emitting the first and second transmission optical beams out of the apparatus as optical beams each having a predetermined angle of divergence, and a driving unit for redirecting the outgoing paths of the first and second transmission optical beams, wherein the second transmission optical beam has a larger angle of divergence than the first transmission optical beam.

6 Claims, 4 Drawing Sheets

OPTICAL FREE-SPACE COMMUNICATION APPARATUS

BACKGROUND OF THE INVENTION

1. Field of the Invention

The present invention relates to an optical free-space communication apparatus for performing communication by propagating an optical beam in free space.

2. Description of the Related Art

Typically, mobile communication by virtue of optical free-space communication is performed by exchanging optical beams B1 and B2, with signals superimposed thereon, between a mobile station 1 such as a vehicle and a fixed station 2 placed on the roadside, as illustrated by way of example in FIG. 1. It is necessary for the fixed station 2 and the mobile station 1 to have a function for performing an acquisition operation so that communication may be initiated when a mobile entity enters a certain communication area, and a tracking operation so that the communication may continue after the acquisition operation.

This is feasible by, for example, an apparatus illustrated in FIG. 2. In a transmitter unit of the apparatus, a primary signal containing information for communication is input from an input terminal 3, and is amplified by an amplifier 4 to an appropriate level. Meanwhile, an auxiliary signal for angle detection (hereinafter referred to as "pilot signal") is generated by an oscillator 5. The primary signal and the pilot signal are combined by a combiner 6 to drive a light-emitting device 7 such as a semiconductor laser source or a light-emitting diode to convert the resulting signal into an optical beam. The optical beam is then emitted by a transmitting optical system 8 to a second party's apparatus as a transmission signal beam B3 having an appropriate angle of divergence.

In a receiver unit, an optical beam B4 from the second party's apparatus enters a receiving optical system 9 for primary signals and a receiving optical system 10 for pilot signals. The beams emerging from the receiving optical systems 9 and 10 are condensed onto a light-receiving device 11 for optical signals, such as an avalanche photodiode (APD) or a PIN diode, and a light-receiving device 12 for pilot signals which serves as an angle detection device, respectively. The primary signal received by the light-receiving device 11 for optical signals is converted from an optical signal to an electrical signal, and is then output from a primary signal output terminal 14 through an amplifier 13.

The light-receiving device 12 is, for example, a photodiode which is divided into four parts 12a to 12d, as shown in FIG. 3, such that outputs of the parts 12a to 12d on which a condensed optical spot S is formed are compared to determine the angle of the optical beam B4 incident on the receiving optical system 10 from the second party's apparatus. The angle signal from the light-receiving device 12 is arithmetically operated on by an arithmetic operation unit 15 to apply a driving signal to a vertical driving unit 16 and a horizontal driving unit 17 so that the optical spot S reaches the center of the angle detection device 12 so that there is no difference in angle between the received optical beam B4 and the receiving optical system 10. It is conditioned so that the optical axes of the transmitting optical system 8 and the receiving optical system 9 are placed at an identical angle, and as a result the transmission optical beam B3 is directed toward the second party's apparatus. In this way, a tracking operation is performed between the mobile station 1 and the fixed station 2.

In such mobile optical communication as illustrated in FIG. 1, the angle of divergence of the outgoing optical beam B1 should be increased as much as possible in order to ensure the acquisition operation. As the angle of divergence increases, however, the amount of light received by the second party's apparatus is reduced in inverse proportion to the square of the angle of divergence, and therefore reception may be difficult.

For example, as shown in FIG. 4, when the mobile station 1 is a vehicle that travels along a wide passageway such as a three-lane road, the divergence of optical beams B1a and B2a as indicated by dotted lines in FIG. 4 is necessary to ensure an optical acquisition at distance L. However, such divergence would reduce the light intensity per unit area in the receiver unit. Should the divergence of optical beams B1b and B2b as indicated by solid lines in FIG. 4 be necessary to provide a sufficient intensity of received light, optical acquisition would be in turn difficult.

To address the foregoing problems, one conceivable method is to prepare two types of transmission optical beams, namely, acquisition/tracking optical beams B1a and B2a containing only pilot signals, and communication optical beams B1b and B2b containing only primary signals. This approach is feasible because the pilot signal contained in an acquisition/tracking optical beam is usually a signal having a single frequency or a signal having an extremely narrow bandwidth compared to the primary signal, which can be then received at a high signal-to-noise ratio even if the received signal is small.

However, two types of signals, namely, an acquisition/tracking optical beam and a communication optical beam require two sets of the light-emitting device 7 and the transmitting optical system 8 shown in FIG. 2, leading to increased cost and size. In particular, it would be disadvantageous to dispose a larger apparatus on the mobile station 1, and, although an apparatus of this type needs to be rapidly driven, increased weight due to increased size would make it difficult.

SUMMARY OF THE INVENTION

Accordingly, it is an object of the present invention to provide an optical free-space communication apparatus which ensures an acquisition/tracking operation and which performs an efficient transmission/reception operation.

To this end, an optical free-space communication apparatus according to the present invention includes a first light-emitting source for emitting a first transmission optical beam having a plane of polarization in a predetermined direction, the first transmission optical beam being modulated according to a primary signal containing communication information, a second light-emitting source for emitting a second transmission optical beam having a plane of polarization perpendicular to the plane of polarization of the first transmission optical beam. The second transmission optical beam is modulated according to an auxiliary signal for angle detection. The apparatus also includes a transmitting optical system for emitting the first and second transmission optical beams out of the apparatus as optical beams each having a predetermined angle of divergence. A driving unit redirects the outgoing paths of the first and second transmission optical beams. The second transmission optical beam has a larger angle of divergence than the first transmission optical beam.

An optical free-space communication apparatus according to the present invention may further include an optical component for splitting a reception optical beam transmitted from another apparatus into a first reception optical beam having a plane of polarization in a predetermined direction and a second reception optical beam having a plane of polarization perpendicular to the plane of polarization of the first reception optical beam. The apparatus may also include a first light-receiving device for detecting the first reception optical beam split by the optical component, a second light-receiving device for detecting the second reception optical beam split by the optical component, and an arithmetic operation circuit for determining the angle control signal based on the output of the second light-receiving device. The driving unit is controlled according to the angle control signal determined by the arithmetic operation circuit. The optical free-space communication apparatus may further include a receiving lens for guiding the reception optical beam transmitted from the other apparatus to the optical component.

In one embodiment, the optical component may include a receiving polarization beam splitter. In another embodiment, the transmitting optical system may include a transmitting polarization beam splitter for combining the first transmission optical beam and the second transmission optical beam, and a transmitting lens for emitting the resulting transmission optical beam combined by the transmitting polarization beam splitter out of the apparatus of interest. The driving unit may include a vertical driving unit for vertically redirecting the travelling paths of the first and second transmission optical beams, and a horizontal driving unit for horizontally redirecting the travelling paths of the first and second transmission optical beams.

Further objects, features and advantages of the present invention will become apparent from the following description of the preferred embodiments with reference to the attached drawings.

DESCRIPTION OF THE PREFERRED EMBODIMENTS

Figure 5:
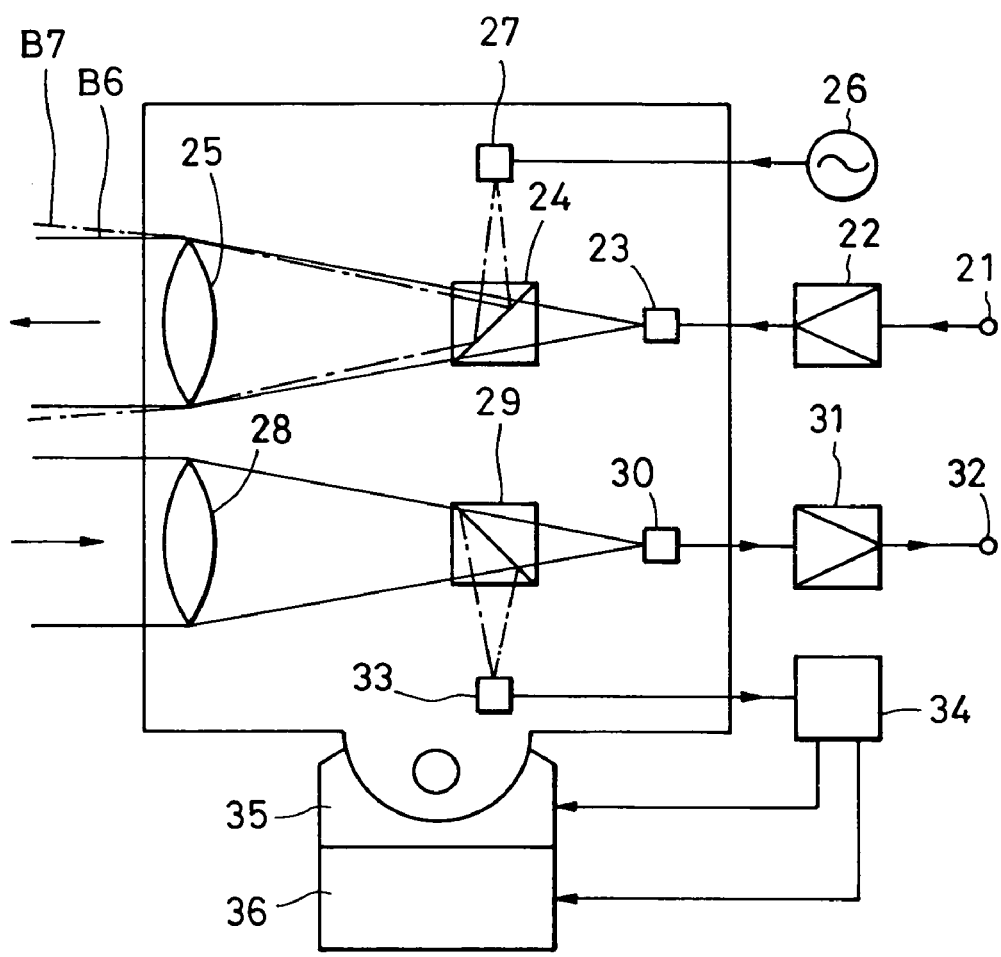
FIG. 5 is a schematic block diagram of an optical free-space communication apparatus according to a first embodiment of the present invention.
Figure 6:
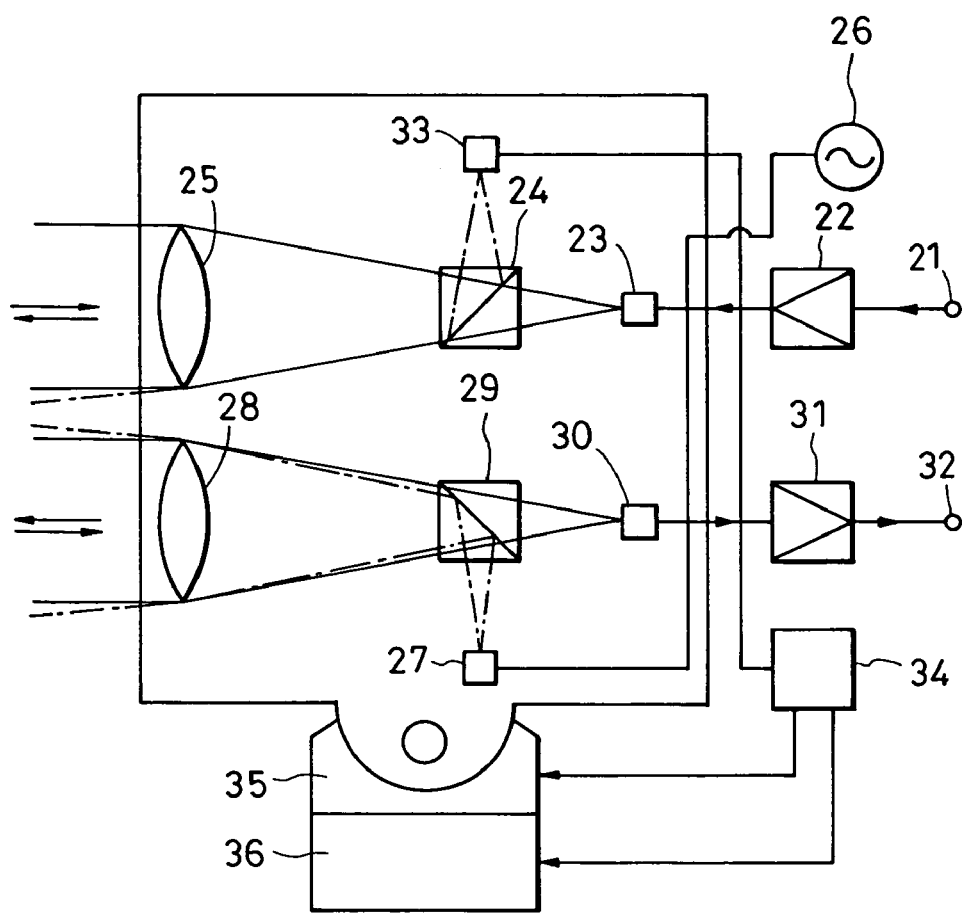
FIG. 6 is a schematic block diagram of an optical free-space communication apparatus according to a second embodiment of the present invention.

The present invention is described in detail in conjunction with its preferred embodiments with reference to FIGS. 5 and 6.

FIG. 5 is a schematic block diagram of an optical free-space communication apparatus according to a first embodiment of the present invention. The input from a transmission signal input terminal 21 is connected to a light-emitting device (a first light-emitting source) 23 through an amplifier 22. A transmitting polarization beam splitter 24 and a transmitting lens 25 are aligned in turn along the outgoing path from the light-emitting device 23. A pilot signal generated by an angle detection oscillator 26 is converted by a light-emitting device (second light-emitting source) 27 into an optical beam, which then enters the polarization beam splitter 24 from the side. A reception light beam is received by a receiving lens 28, followed by a receiving polarization beam splitter 29 and a light-receiving device (first light-receiving device) 30 along the optical axis of the receiving lens 28. The output of the light-receiving device 30 is connected to a reception signal output terminal 32 through an amplifier 31. An angle detection device (second light-receiving device) 33 is disposed away from the receiving polarization beam splitter 29 in the reflecting direction, and the output of the angle detection device 33 is led to an arithmetic operation unit (arithmetic operation circuit) 34. The outputs of the arithmetic operation unit 34 are connected to a vertical driving unit 35 and a horizontal driving unit 36, respectively.

In a transmitter unit, a primary signal containing communication information is input from the transmission signal input terminal 21, and is then amplified by the amplifier 22 to an appropriate level, and the resulting signal is converted from an electrical signal into an optical signal by the light-emitting device 23. The light-emitting device 23 is implemented as a semiconductor laser source by way of example, and the light emerging therefrom is linearly polarized. On the other hand, a pilot signal generated by the angle detection oscillator 26 is converted into an optical signal by the light-emitting device 27, which is also implemented as a semiconductor laser source by way of example. The transmitting polarization beam splitter 24 transmits substantially 100% of waves having a polarization parallel to the plane of FIG. 5 through a bonded plane thereof, and reflects substantially 100% of waves having a polarization vertical to the plane of FIG. 5 at the bonded plane.

Since the light-emitting device is installed so that light may be polarized in parallel to the plane of the same figure, the light emerging from the light-emitting device 23 indicated by a solid line travels through the transmitting polarization beam splitter 24. The light is then emitted to a second party's apparatus by the transmitting lens 25 as a primary signal transmission beam B6 having an angle of divergence indicated by a solid line.

Since the light-emitting device 27 is installed so that light may be polarized vertical to the plane of the same figure, an optical beam B7 emerging from the light-emitting device 27 indicated by a dotted line is reflected by the transmitting polarization beam splitter 24. The light-emitting device 27 is more distant from the focusing position of the optical system 25 than the light-emitting device 23, so that the acquisition/tracking optical beam B7 is slightly broader than the primary signal transmission beam B6 when it is emitted.

In a receiver unit, the primary signal optical signal and the acquisition/tracking optical signal simultaneously enter the receiving lens 28. The primary signal optical signal which is polarized in a horizontal manner relative to the plane of the same figure is transmitted through the receiving polarization beam splitter 29, as indicated by a solid line. The optical signal is then focused onto the light-receiving device (first light-receiving device) 30 such as an APD or a PIN photodiode, where it is converted into an electrical signal. In turn, the received primary signal amplified by the amplifier 31 to an appropriate level is provided, and is output from the reception signal output terminal 32.

Figure 1:
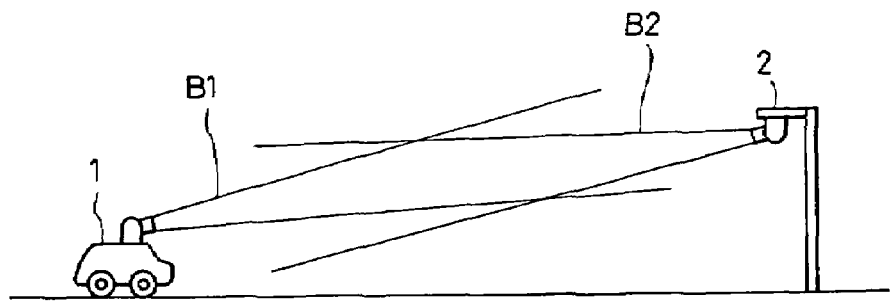
FIG. 1 is a schematic view of a conventional optical free-space communication apparatus for use in mobile communication.
Figure 2:
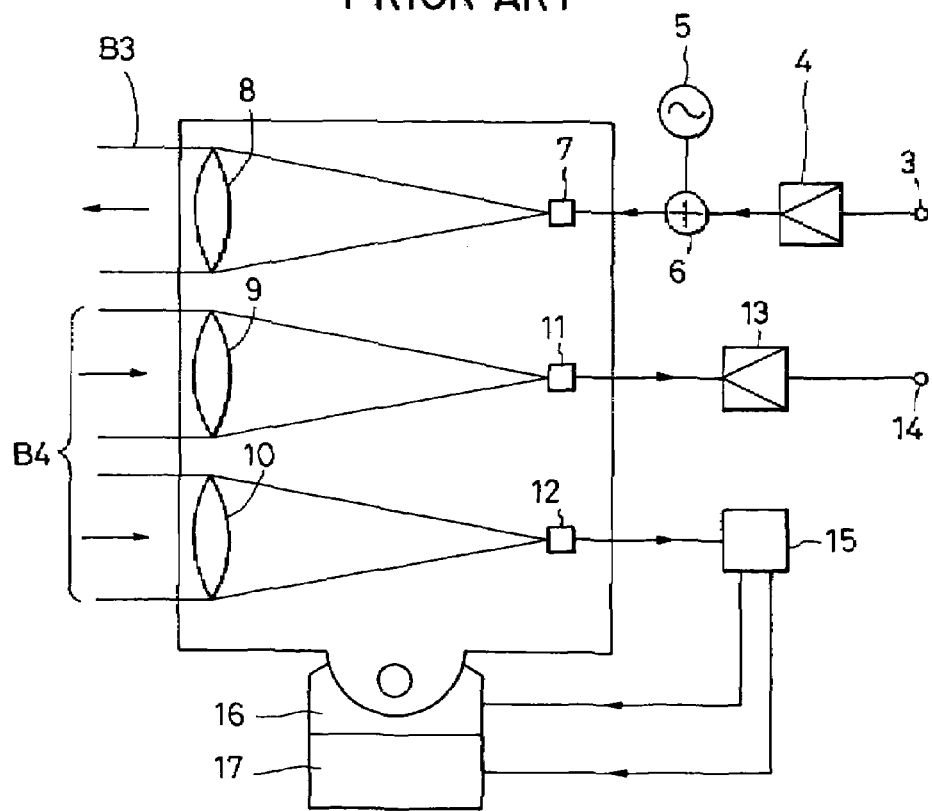
FIG. 2 is a schematic block diagram of a structural example of a conventional optical free-space communication apparatus.
Figure 3:
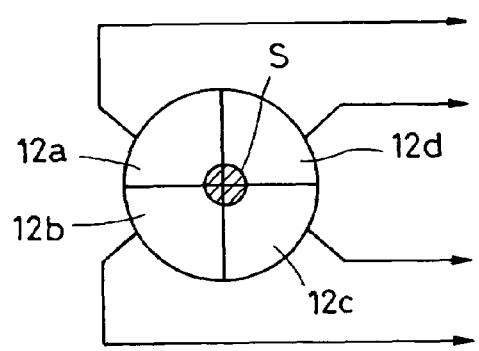
FIG. 3 is a schematic view of the structure of a light-receiving device of the conventional optical free-space communication apparatus shown in FIG. 2.
Figure 4:
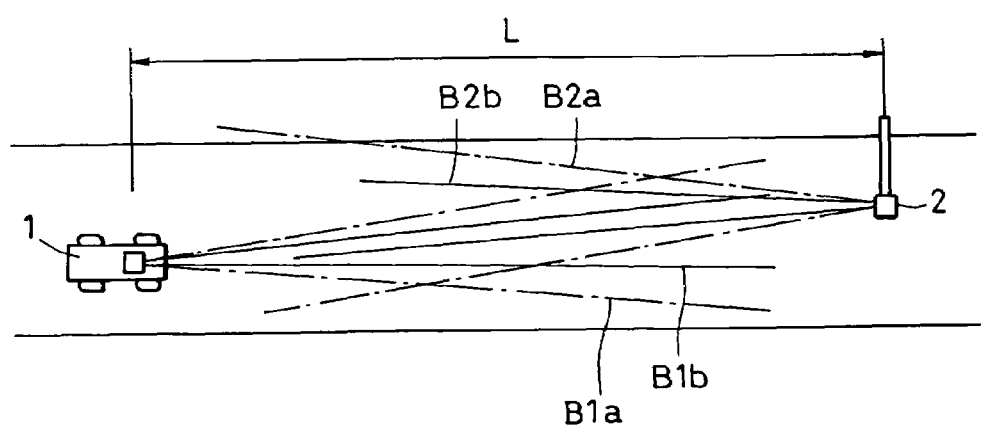
FIG. 4 is a schematic view of a conventional optical free-space communication apparatus for use in mobile communication.

On the other hand, the acquisition/tracking optical signal which is polarized in a vertical manner relative to the plane of the same figure is reflected by the receiving polarization beam splitter 29, as indicated by a dotted line, and is focused onto the angle detection device (second light-receiving device) 33. The following procedure is similar to that described with respect to the conventional example shown in FIG. 2, in which the output from the angle detection device 33 is processed by the arithmetic operation unit (arithmetic operation circuit) 34 to generate an angle control signal. The angle control signal is fed back to the vertical driving unit 35 and the horizontal driving unit 36, and these driving units are driven according to the angle control signal to perform a tracking operation.

Accordingly, the polarization beam splitters 24 and 29 enable a reliable acquisition/tracking operation with an extremely simple structure and high efficiency, without optical loss.

FIG. 6 is a schematic block diagram of an optical free-space communication apparatus according to a second embodiment of the present invention. This optical free-space communication apparatus is different from the optical free-space communication apparatus according to the first embodiment in that the light-emitting device 27 for pilot signals and the angle detection device 33 are interchanged. The second embodiment has the same function and features as those of the first embodiment in which the polarization beam splitters 24 and 29 are used to efficiently combine and split optical signals.

However, the apparatus of this type does not require high accuracy because a pilot signal beam has a large angle of divergence, but requires high accuracy for angle between the primary signal beam and the angle detection device. For this reason, a position adjuster useful for adjustment during manufacture between light-emitting device 23 for primary signals and the angle detection device 33 is incorporated in the common lens 25, thereby facilitating the adjustment compared with the first embodiment.

While the first and second embodiments have been described with respect to an optical free-space communication apparatus for mobile entities, the application of the present invention is not specifically limited to mobile entities. When the present invention is applied to an optical free-space communication apparatus which is fixed and installed within buildings, there are various advantages. The acquisition/tracking optical beam can be used to provide an easy directional adjustment during installation or maintenance. Otherwise, during operation, if wind or vibration causes the beam to be temporarily deviated, causing a primary signal interruption, an automatic tracking operation may be immediately activated for recovery as long as the acquisition/tracking optical beam is not disengaged.

As mentioned above, according to an optical free-space communication apparatus of the present invention, an optical beam for primary signal transmission having a small angle of divergence and an acquisition/tracking optical beam having a large angle of divergence are delivered with these optical beams having polarization orientations deviating from each other by 90°. This ensures an acquisition/tracking operation and provides efficient transmission/reception, realizing a low-cost and compact apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical free-space communication apparatus comprising:
   a first light-emitting source for emitting a first transmission optical beam having a plane of polarization in a predetermined direction, the first transmission optical beam being modulated according to a primary signal containing communication information;
   a second light-emitting source for emitting a second transmission optical beam having a plane of polarization perpendicular to the plane of polarization of the first transmission optical beam, the second transmission optical beam being modulated according to an auxiliary signal for angle detection;
   a transmitting optical system for emitting the first and second transmission optical beams out of said optical free-space communication apparatus as optical beams each having a predetermined angle of divergence; and
   driving means for redirecting the outgoing paths of the first and second transmission optical beams,
   wherein the second transmission optical beam has a larger angle of divergence than the first transmission optical beam.

2. An optical free-space communication apparatus according to claim 1, further comprising:
   an optical component for splitting a reception optical beam transmitted from another apparatus into a first reception optical beam having a plane of polarization in a predetermined direction and a second reception optical beam having a plane of polarization perpendicular to the plane of polarization of the first reception optical beam;
   a first light-receiving device for detecting the first reception optical beam split by said optical component;
   a second light-receiving device for detecting the second reception optical beam split by said optical component; and
   an arithmetic operation circuit for determining the angle control signal based on the output of the second light-receiving device,
   wherein said driving means is controlled according to the angle control signal determined by said arithmetic operation circuit.

3. An optical free-space communication apparatus according to claim 2, wherein said optical component comprises a receiving polarization beam splitter.

4. An optical free-space communication apparatus according to claim 2, further comprising a receiving lens for guiding the reception optical beam transmitted from the other apparatus to said optical component.

5. An optical free-space communication apparatus according to any one of claims 1 to 4, wherein said transmitting optical system comprises a transmitting polarization beam splitter for combining the first transmission optical beam and the second transmission optical beam, and a transmitting lens for emitting the resulting transmission optical beam combined by said transmitting polarization beam splitter out of said optical free-space communication apparatus.

6. An optical free-space communication apparatus according to any one of claims 1 to 4, wherein said driving means comprises a vertical driving unit for vertically redirecting the travelling paths of the first and second transmission optical beams, and a horizontal driving unit for horizontally redirecting the travelling paths of the first and second transmission optical beams.

* * * * *